May 5, 1925.
H. M. CRANE
BRAKE MECHANISM
Filed June 2, 1922 2 Sheets-Sheet 2
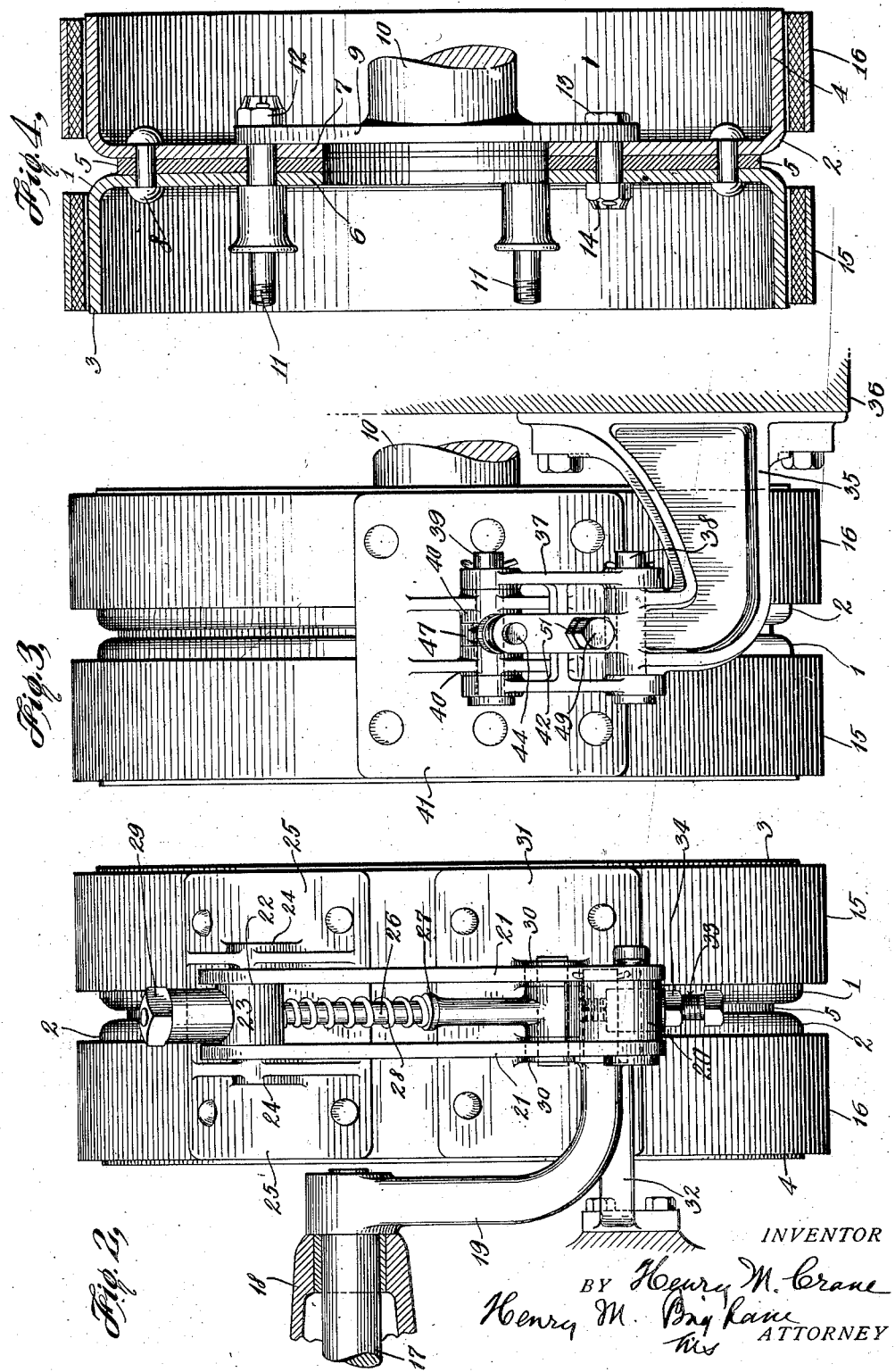
INVENTOR
BY Henry M. Crane
Henry M. Brigham
ATTORNEY Patented May 5, 1925.

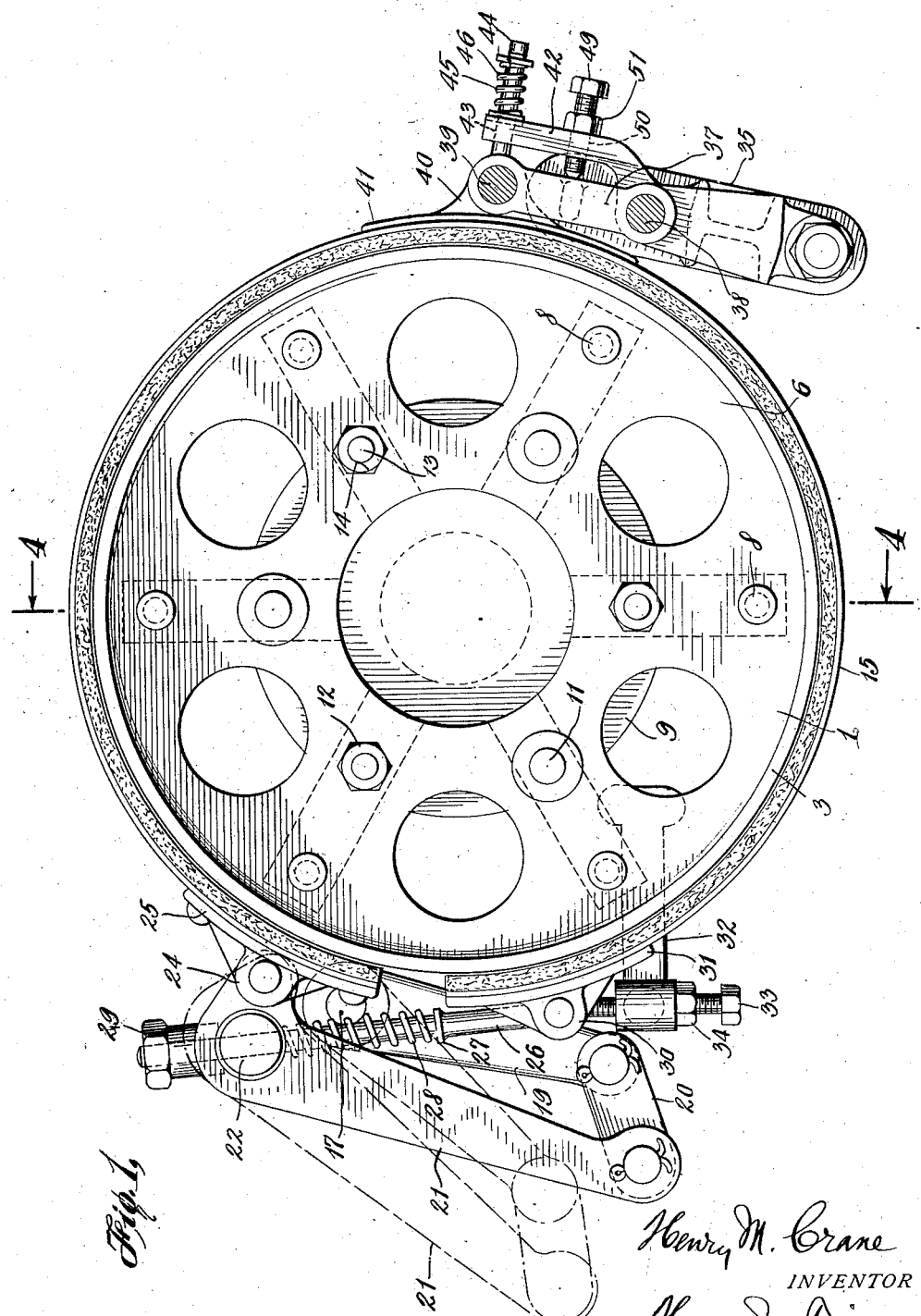

1,536,076

UNITED STATES PATENT OFFICE.

HENRY M. CRANE, OF NEW YORK, N. Y.

BRAKE MECHANISM.

Application filed June 2, 1922. Serial No. 565,289.

*To all whom it may concern:*

Be it known that I, HENRY M. CRANE, a citizen of the United States, residing in the borough of Manhattan, city, county, and State of New York, have invented certain new and useful Improvements in Brake Mechanism, of which the following is a specification.

My invention relates to brake mechanism and is particularly designed for use on motor vehicles. The objects of my invention are to produce brake mechanism which will improve the dissipation of heat by providing for a better circulation of air, which will insure a more uniform pressure of the brake bands over the whole surface of the drums and the lowest possible unit pressure over the whole braking mechanism; to provide brake mechanism which will not chatter, but will be durable, smooth and efficient in operation and which will render it possible to use pressed steel drums without danger of their being unduly distorted by heat generated by friction when the brake is applied. The other objects will be more fully set forth in the following specification.

Preferably, as illustrated in the accompanying drawings, my brake mechanism is applied to the transmission shaft of a motor vehicle.

In the accompanying drawings Figure 1 is an elevation of my improved drum viewed from the rear.

Figure 2 is an elevation viewed from the side, on which the operating lever is mounted.

Figure 3 is an elevation from the opposite side.

Figure 4 is a section on the line 4—4 of Figure 1.

Similar numerals refer to similar parts throughout the several views.

Brake mechanism in order to be durable, smooth and efficient in its action must provide adequate braking surfaces on both the brake bands and the drums. It is also essential that the brake band shall press upon the face of the drum with uniform pressure contact over substantially the entire surfaces of the brake band and the drum in order to avoid the generation of undue heat and excessive wear. Excessive pressure over small areas results in generation of undue heat and excessive wear at these points and causes the band to grab and let go at the points of excessive pressure, which renders the brake mechanism inefficient, rough and jerky in its action. As brake drums on motor vehicles are necessarily limited as to their diameter, it has heretofore been found necessary to use brake drums of considerable width in order to provide adequate braking surface. Where pressed sheet metal drums have been used these were usually in the form of a disc with a flanged rim. The heat generated by the application of the brake bands to such a flanged rim causes the rim to expand. As the disc tended to restrict the expansion of the rim adjacent thereto the rim was distorted by such expansion into the form of a truncated cone which caused the brake band to bear with undue pressure on the outer edge of the rim and to prevent equal application of the band to the drum over its entire surface.

I avoid danger of disturbing distortion by using in the preferred form of my invention two brake drums, each having a rim of one-half the width that would be necessary to provide adequate braking surface, if a single drum were used. I provide for a better dissipation of the heat generated by so mounting the two drums as to permit a free circulation of air between them and provide separate brake bands for each drum.

In the preferred form of my invention, as illustrated, in Figures 1, 2, 3 and 4, I use two drums 1 and 2 pressed from sheet metal. This enables me to provide the same braking surface with two drums having rims 3 and 4 each of approximately one-half the width which would be necessary if a single drum were used.

I arrange the drums 1 and 2 back to back, as shown, and interpose metal spacers 5 between the discs 6 and 7 of the drums 1 and 2. I firmly secure the drums to each other and the metal spacers 5, in position between them, by the rivets 8. This construction provides an open air space between the discs 6 and 7 and permits a free circulation of air between these discs and thereby aids materially in the dissipation of heat.

As shown in Figure 4, the disc 9, which is secured to the end of the drive shaft 10 is secured to both drums by the studs 11 and nuts 12, the studs 11 passing through the discs of both drums and the metal spacers 5 and also by bolts 13 and nuts 14, the bolts 13 also passing through the discs of both drums and the metal spacers. The projecting ends of the studs 11 provide means for securing a driven shaft, not shown, to the drums. Instead of using one wide brake band to provide the necessary braking surface, I provide two brake bands 15 and 16. This construction does not interfere with the free circulation of air between the discs 6 and 7. The use of two narrow brake bands instead of a single wide brake band also insures a more uniform application of pressure over the whole surface of the brake drums and therefore a lower unit pressure over the whole braking surface and eliminates chattering.

In order to secure these much desired results it is also necessary that all applications of force to the bands shall be applied to the ends of the bands in a direction as nearly as possible tangentially to the drums and this my operating mechanism which I will now describe is designed to accomplish.

My operating mechanism consists of a shaft 17 mounted in a bearing 18 anchored to the frame of the vehicle. On the end of the shaft 17 is an arm 19. To the outer end of the arm 19 is pivoted a link 20. The other end of the link 20 is pivoted to one end of the bell crank levers 21 which are pivotally fulcrumed at 22 to the fulcrum member 23 interposed between them. The other ends of the levers 21 are pivotally connected, as shown, to the lug 24 formed on the bracket 25 by which the adjacent ends of the two brake bands 15 and 16 are connected. The fulcrum member 23 is bored to receive a rod 26 upon which a shoulder 27 is formed. A spring 28 is mounted on the rod 26. One end of this spring bears against the shoulder 27 and the other end against the fulcrum member 23. The spring 28 tends to force the rod 26 away from the fulcrum member 23. An adjusting nut 29 on the threaded end of the rod 23 limits this movement of the rod 26. The other end of the rod 26 is pivotally connected to the lug 30 on the bracket 31 which secures the opposite adjacent ends of the brake bands to each other.

I provide an adjustable support for the ends of the brake band consisting of a bracket 32 anchored to the frame of the vehicle, the outer end of which is bored and threaded to receive the threaded stud 33, upon which is mounted a lock nut 34 which provides means for adjusting the stud 33 in the bracket 32 and securely locking it in any adjusted position. The stud 33 is so positioned as to contact with the lug 30 and limit the downward movement of the brake bands under the force of gravity, and support the ends of the brake bands out of contact with the drums.

On the opposite side of my drums, I provide a bracket 35 secured to the frame 36 of the vehicle and a link 37 pivotally connected to the bracket 35 by the pin 38. The other end of the link 37 is pivotally connected by the pin 39 to the lug 40 on the bracket 41 which connects the brake bands 11 and 12 to each other midway between their ends. Formed integrally with the bracket 35 is an arm 42 having a guide 43 formed in its outer end for a stem 44. A spring 45 is mounted on the outer end of the stem 44. One end of this spring 45 bears against the arm 42 and the other against a washer 46 secured on the outer end of the stem 44. The stem 44 is provided with a head 47 which is bored to receive the pin 39, by which it is pivoted to the link 37. This mechanism causes the spring 45 to normally hold the brake bands 15 and 16 out of engagement with the drums 1 and 2 and to permit the brake bands to swing into contact with the drums when the operating shaft 17 is rotated. It also prevents the brake bands from traveling with the drums when the bands are applied and in contact therewith. A threaded stud 49 mounted in a threaded bore 50 in the arm 42 and the lock nut 51 form an adjustable stop by which the movement of the brake bands 11 and 12 away from the drums 1 and 2 under the action of the spring 45 are limited. The dotted lines in Figure 1 show the positions which the parts assume when the operating shaft 17 is rotated and the brake bands 15 and 16 are drawn into contact with the drums.

The operation of my device is as follows:

The brake bands 15 and 16 are formed of material having sufficient rigidity to enable them under all conditions to maintain a substantially circular form, the diameter of their normal circles being slightly greater than the diameter of the drums. As shown in Figure 1, the brake bands when not in use are supported midway between their ends by the bracket 35 and the link 37 and at these points are held out of engagement with the drums 1 and 2 by the spring 45 acting upon the stem 44. The ends of the brake bands fall by gravity until the lug 30 contacts with the end of the stud 33, the stud 33 being so adjusted as to normally hold the ends of the brake bands out of contact with the drums. By this means the brake bands are prevented from dragging when not in use. The clearance between the brake bands and the drums is readily adjusted by means of the single nut 29 on the outer end of the rod 26 and the position of the brake bands with reference to the drums when the bands have been adjusted is regulated by means of the studs 33 and 49.

When the shaft 17 is rotated the arm 19 swings into the position shown in the dotted lines carrying with it the link 20 and the bell crank levers 21 until they also assume the positions shown in the dotted lines. This movement causes the fulcrum 22 of the levers and the rod 26 to rise and draw the lower ends of the brake bands into contact with the drums. Further upward movement of the fulcrum then being arrested, the levers 21 are then compelled to turn on their fulcrum 22 and the ends of the levers being pivotally connected to the lug 24 on the bracket 25 connecting the upper ends of the brake bands, the ends of the brake bands are forced toward each other, causing the brake bands to contract and swing on the link 37 into contact with the drums and as the force is applied tangentially or substantially so, to the ends of the brake bands, the brake bands are contracted, still retaining their circular form, until the entire braking surface is in contact with the drums, the link 37 preventing any rotary movement of the brake bands about the axis of the drums.

This mechanism causes the entire braking surface of the brake bands to be applied to the surface of the drums with equal pressure at all points of contact and insures maximum braking effect, the lowest possible unit pressure and evenly distributed wear over the whole braking surface.

My brake bands may be readily adjusted by means of the single nut 29 which serves to reduce the diameter of the circle which the bands are permitted to assume. It will be noted that the arm 19, link 20 and levers 21 are of such length and the fulcrum 22 so positioned that in all positions the longitudinal axis of the link 20 is substantially radial to the drums and the length of the arms of the levers 21 and the pivotal points where the levers 21 and the rod 26 are connected to the brackets 25 and 31 are so positioned that the pull on the ends of the brake bands is substantially tangential to said bands. This prevents the bands from being distorted from their normal circular form when contracted and insures uniform contact over the entire braking surface.

I claim:

1. Brake mechanism comprising a brake drum composed of two metal discs with flanged rims secured together back to back with an open air space between such discs.

2. Brake mechanism comprising a brake drum composed of two metal discs with flanged rims secured together with an open air space between such discs, a brake and means for applying such brake to such brake drum.

3. Brake mechanism comprising in combination a plurality of drums, each consisting of a disc and rim, spacers interposed between the discs of the drums and means for securing the drums to each other and the spacers in position, a brake and means for applying the brake to the drum.

4. Brake mechanism comprising in combination two drums, each consisting of a disc and rim, spacers interposed between the discs of such drums, means for securing the drums to each other and the spacers in position, two brake bands, one encircling each drum and means for contracting such brake bands.

5. Brake mechanism comprising in combination two drums, each consisting of a disc and rim, spacers interposed between the discs of such drums, means for securing the drums to each other and the spacers in position, two circular brake bands, one encircling each drum, and means for contracting such brake bands by applying force tangentially to the ends of the brake bands.

6. Brake mechanism comprising in combination two drums, each consisting of a disc and rim arranged back to back with an open air space between the discs of such drums, two brake bands, one encircling each of said drums, and means for contracting such brake bands.

7. Brake mechanism comprising in combination two drums arranged back to back with an open air space between the discs of such drums, two brake bands, one of which encircles each of said drums and means for applying force tangentially to the ends of said brake bands.

8. Brake mechanism comprising in combination two drums fabricated from sheet metal, each consisting of a disc and rim arranged back to back with an open air space between the discs of such drums, a brake, and means for bringing the brake into contact with the rims of the drums.

9. Brake mechanism comprising a brake drum composed of two metal discs with flanged rims secured together back to back.

10. Brake mechanism comprising a brake drum composed of two metal discs with flanged rims secured together back to back and two circular brake bands one encircling each flanged rim and means for contracting such brake bands.

HENRY M. CRANE.